Jan. 28, 1930. A. F. MARGOT ET AL 1,745,264
TENT
Filed Feb. 27, 1928 2 Sheets-Sheet 1
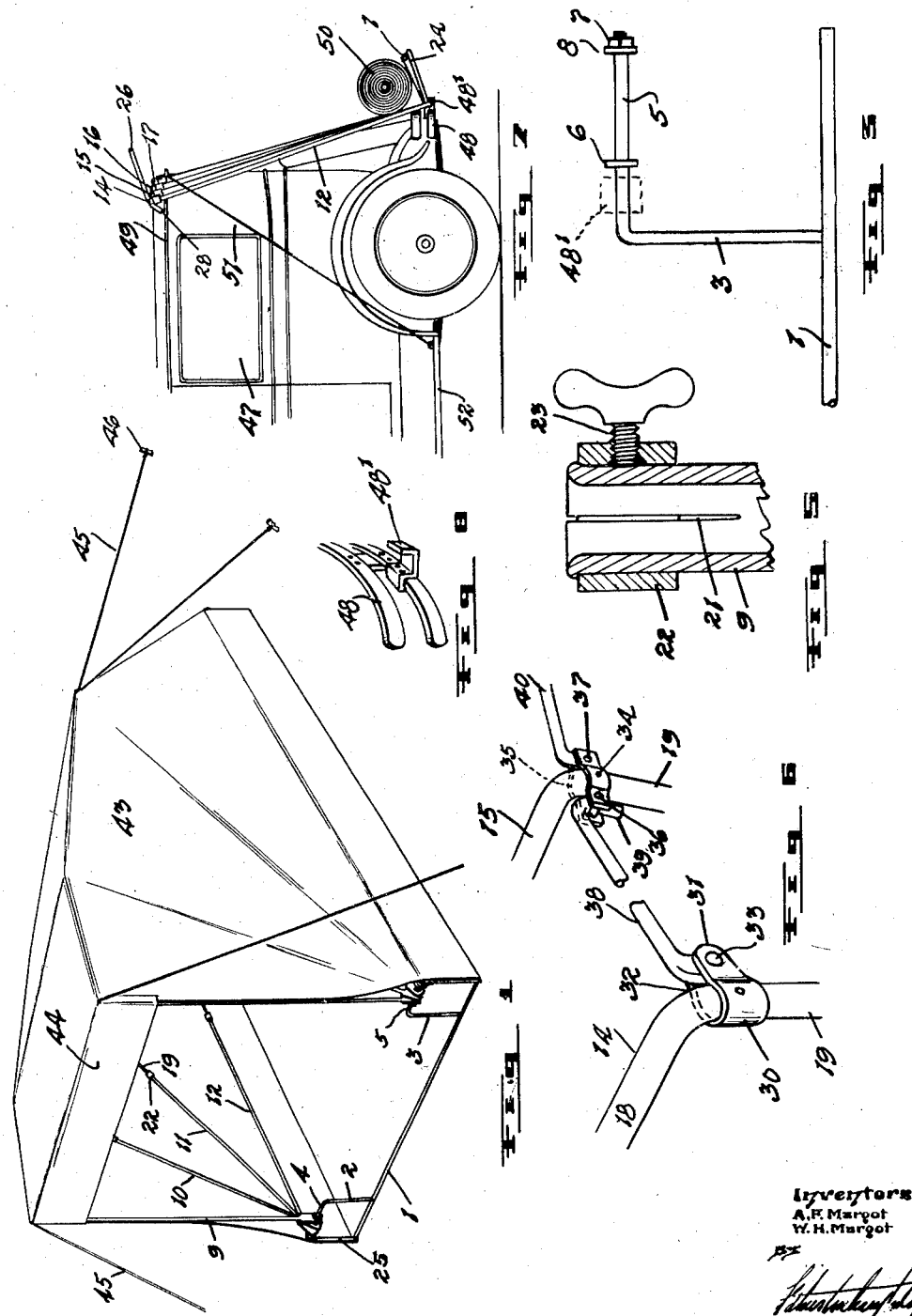
Inventors
A. F. Margot
W. H. Margot

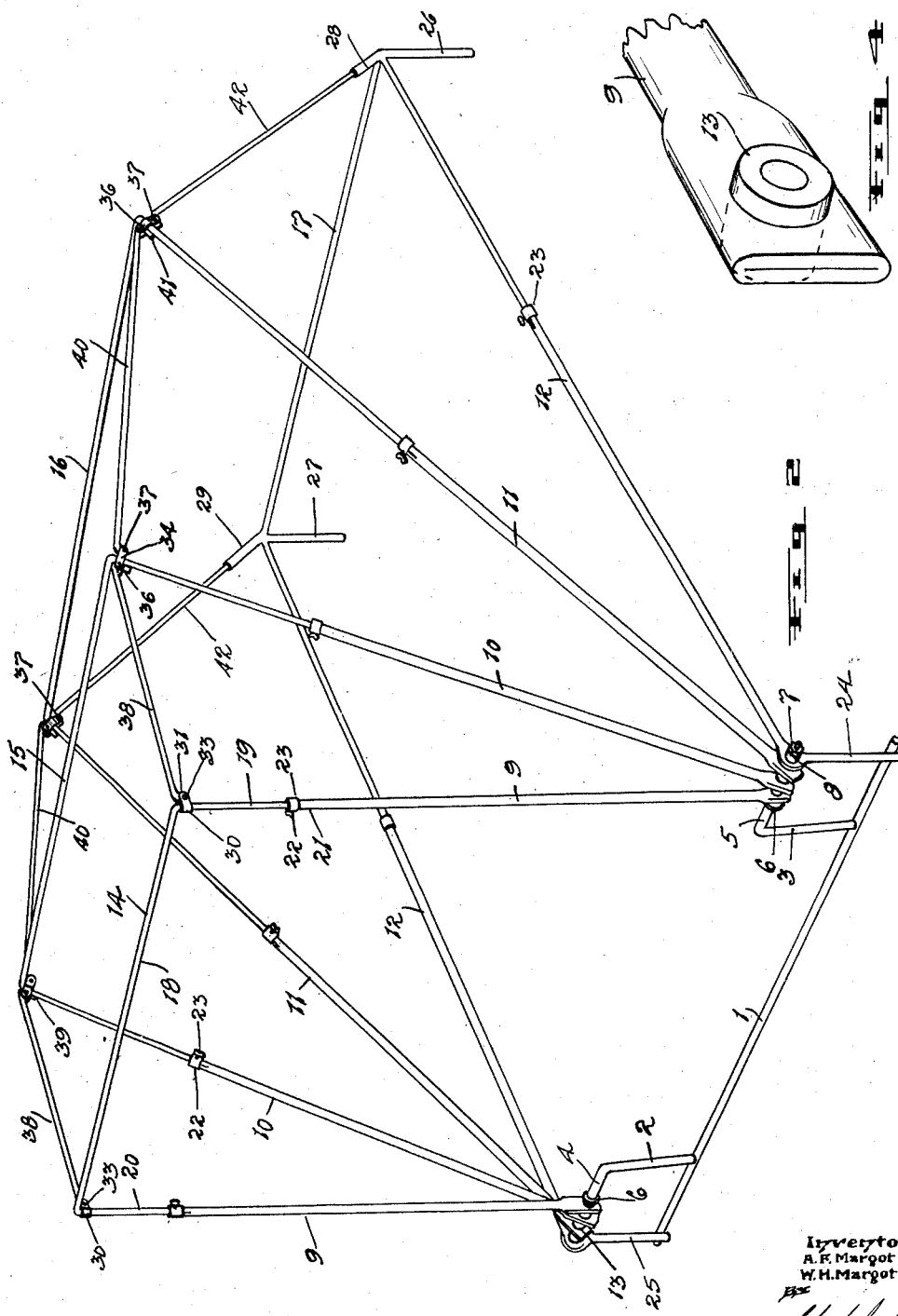

Patented Jan. 28, 1930

1,745,264

UNITED STATES PATENT OFFICE

AUGUSTUS F. MARGOT, OF WINNIPEG, AND WILLIAM H. MARGOT, OF STURGEON CREEK, MANITOBA, CANADA

TENT

Application filed February 27, 1928, Serial No. 257,432, and in Canada February 11, 1928.

The invention relates to improvements in tents and an object of the invention is to provide a tent structure which can be easily and quickly erected or taken down and which when in the folded or not in use position can be readily mounted and takes but little room for storage purposes.

A further object of the invention is to provide a tent structure which when folded can be readily stacked on the rear end of an automobile and suspended from the rear bumper or bumperette thereof and which presents a plurality of arches spanning the car body and also provides a rest for supporting and carrying the canvas.

A further object of the invention is to construct the structure in a simple, durable and inexpensive manner and so that it will be comparatively light in weight and such that it can be readily erected by a single individual.

With the above more important and other minor objects in view which will become more apparent as the description proceeds, the invention consists essentially in the arrangement and construction of parts hereinafter more particularly described, reference being had to the accompanying drawings, in which:—

Fig. 1 is a perspective view of the tent in its set up or used position.

Fig. 2 is a perspective view of the frame structure of the tent, the canvas covering being omitted.

Fig. 3 is an enlarged detailed face view of one end of the front cross rod.

Fig. 4 is an enlarged detailed perspective view of one end of one of the side arms.

Fig. 5 is an enlarged detailed vertical sectional view showing the adjusting screw and band carried by one of the telescoping tubes.

Fig. 6 is a perspective view of the rod and adjoining portions of the arches.

Fig. 7 is a side view of the device as it appears in stacked position on the back of an automobile.

Fig. 8 is a perspective view of one of the supporting brackets carried by the rear bumper or bumperette.

In the drawings like characters of reference indicate corresponding parts in several figures.

This tent structure is specially adapted for touring purposes and is designed to take an upstanding stacked position supported by the rear bumper or bumperette of an automobile and spanning the body of the car and to provide a support for the canvas covering when in such stacked position.

A rigid front spacing rod or bar 1 is provided, this having a length so that when placed on an automobile in a manner later described, will not project beyond the outer edges of the mud guards of the car. The rod is provided adjacent the ends with two upstanding arms 2 and 3 which have their upper ends out turned to provide supporting spindles 4 and 5. Each spindle carries a permanent collar 6 and has the outer end reduced and screw threaded to receive a nut 7 to the inner side of which we place a washer 8. On each spindle between the collar and washer, we have mounted rotatably the lower ends of a plurality of tubular arms 9, 10, 11 and 12 and here it will be observed that the arms are arranged in pairs, one at either side of the structure. The lower ends of the tubular arms are herein shown as flattened and as fitted with spacing sleeves 13 which receive the spindle. Any other means can, however, be employed for mounting and spacing the arms on the spindles.

The pairs of tubular arms are connected by arches or yoke members 14, 15, 16 and 17, said yoke members presenting cross portions 18 and side legs 19 and 20 which telescopically enter the upper ends of the tubular side arms. Means is provided for adjustably fastening the legs in the tubes and we have herein shown the ends of the tubes as longitudinally slotted as best indicated in Figure 5 at 21 and carrying a band 22, the band being provided with a jam screw 23 engageable with the tube and the arrangement being such that when the jam screw is screwed in, the split sides of the tube are drawn together to clamp or jam the entered side leg. Whilst we have given a detailed description of this clamping means, we, of course, do not desire to be limited to such construction as any easily manipulated, simple, durable means will serve our purpose.

The pair of tubes 12 are provided at their forward ends with corner legs 24 and 25 positioned at right angles to said tubes and the arch 17 is provided at the rear corners with further corner legs 26 and 27 similar to those 24 and 25. The corners of the arch 17 also carry upwardly inclined tubular sockets 28 and 29 for a purpose later disclosed. To the upper ends of the side legs of the front arch, we fasten permanently similar straps 30, the straps being passed around the legs and having their ends extending to provide a pair of lugs 31 and 32 which are connected by a cross pin 33.

The upper ends of the side legs of the arches 15 and 16 are all supplied each with a pair of opposing plates 34 and 35 permanently fastened to said legs and having their ends projected to provide two pairs of opposing lugs which carry cross pins 36 and 37. On the cross pins 33, we mount pivotally the forward ends of spacing rods 38 and these spacing rods have the rear ends thereof hooked as indicated at 39 and the hooks are adapted to catch the pins 36 in the manner best shown in Figure 6. The pins 37 support pivotally the forward ends of further spacing rods 40, which have their rear ends hooked as indicated at 41 to catch the pins 39 carried by the arch 16. The pins 37 of the arch 16 carry pivotally the ends of further spacing rods 42 which have their lower ends adapted to slidably enter the sockets 28 and 29 hereinbefore described.

When the structure is erected in the manner best shown in Figure 2, it is enclosed within a canvas or such like covering 43 shaped to fit over the set up structure. Here it will be observed that the canvas has a forward cross strip 44 which forms with the roof and sides of the canvas, a forward catch or pocket utilized in setting up the tent.

When the tent is to be set up, the legs 24 and 25 are entered in the ground to anchor them and then the arch 17 is pulled back and the legs 26 and 27 are driven into the ground a short distance. The distance which the arch 17 is pulled back will of course be learned by experience as the side arms 12 and arch 17 at such time from the base of the tent structure which the canvas is predesigned to fit. The front arch can now be raised so that the arms 9 take a vertical position as shown and subsequently the other arches can be raised and anchored in their inclined positions by catching the hooks of the spacing rods on the proper pins 39 and by passing the lower ends of the spacing rods 42 in the sockets.

The canvas covering can then be spread over the erected frame and the arches can be expanded or shoved out and fastened to take up any slack appearing in the canvas. It will of course be understood that the canvas covering can be provided as and where desired along its bottom edge and at the inner side with suitable tie strings (not shown) for fastening to the arms 12 and the arch 17. These will prevent the lifting of the sides of the covering when the tent is in use. Suitable guy ropes indicated at 45 can be employed together with ground stakes 46 for holding the tent from being blown over by excessive wind.

As before stated, this tent structure is specially designed so that it can be carried on the rear end of an automobile, such as shown at 47 Figure 7. Usually automobiles are provided with rear bumpers or bumperettes 48 and we supply the bumpers or bumperettes with a pair of supporting brackets indicated at 48′, the brackets being fastened firmly to the bumper or bumperette and presenting any suitable means for fastening the spindles 4 and 5. We have herein shown the bracket as hook shaped to receive the spindles but obviously straps or other suitable means could be employed to effect the fastening. It will be observed in Figure 3 that there is a portion of the spindle between the collar and the vertical arm 3 reserved to receive the fastening means and in said figure, we have shown in dotted outline the position of the bracket supporting the spindle.

When the tent structure or frame work is being designed, the horizontal distance between the front arms 9 is gauged so that when the structure is mounted on the back of an automobile in the manner shown in Figure 7, the side arms will pass to the sides of the closed body 49 of the automobile.

The tent frame work or structure is taken down by first removing the canvas covering, then releasing the hooked and socketed ends of the spacing rods and finally undoing the clamping means fastening the side legs to the tubes. The arches are then pulled in to their innermost positions, that is to say, the side legs are folded telescoping within the tubes. The tubes 9, 10 and 11 and rods carried thereby are then swung down to take a folded position within the side tubes 12 and the arch 17 at which time the spacing rods are also folded to lie parallel with the tubular side arms. The parts if desired can then be strapped or tied by rope in such position which is the collapsed or folded position of the structure.

The structure is then picked up bodily and placed on the back of the automobile with the brackets receiving and supporting the spindles 4 and 5 and the collapsed arches receiving the body of the car in the manner best shown in Figure 7. The legs 24 will at this time be extended at a slight incline rearwardly from the sides of the tubes 12 and as the ends of the rod 1 are at this time above and engaged with the ends of the said legs, we have a carrier for receiving and supporting the rolled up canvas covering indicated at 50 Figure 7. The canvas covering can be strapped or tied in place in the well known manner.

After the tent has been placed in stored position on the back of the automobile as shown, the arches can be held against swinging backwardly by tie ropes 51 extending from the arches to the running board 52 of the automobile.

From the above it will be seen that we have provided a tent structure which can be easily and quickly erected by a single individual and which when set up gives ample head room inside and is well stayed against the elements and further that the structure provided is so arranged that it can be readily mounted on the rear part of an automobile in stacked position and spanning the body of the automobile and that at such time a carrier is provided for supporting the rolled canvas body or covering.

What we claim as our invention is:—

1. In a tent structure, a pair of axially aligned, spaced spindles, a plurality of arches having their extending ends pivotally mounted on the spindles, said arches being designed to nest one inside the other when folded and to form a supporting frame work when extended, spacing members detachably fastening the arches together in their extended positions and a fabric covering shaped to receive and enclose the sides and top of the frame work.

2. A tent structure comprising a ground rod, a pair of spaced, elevated, axially aligned spindles carried by the ends of the ground rod, a plurality of arches having their ends pivotally mounted on the spindles, said arches being designed when folded to nest one within the other and when extended to form a supporting frame work at which time one of the arches is horizontally disposed, another of the arches is vertically disposed and the remaining arches are in various angular positions between the former arches, corner legs extending groundward from the horizontal arch, spacing members detachably connecting the several arches in their extended positions and a fabric covering shaped to fit over the frame work and enclose the sides and top thereof.

3. A tent structure comprising a ground rod of predetermined length, arms extending upwardly from the ends of the ground rod and having their upper ends out turned to provide aligned pivot spindles, a plurality of pairs of side arms pivotally carried by the spindles and having their free ends spaced apart, pairs of side legs adjustably fastened to the pairs of arms, said side legs being connected by cross members, spacing rods extending between the side legs, each rod having one end pivotally attached to one of the legs and detachably connected to the next adjacent leg, ground engaging legs extending downwardly from the pivot end of one pair of side arms, ground engaging legs extending downwardly from the free ends of the side legs carried by that pair of arms and a fabric covering shaped to enclose the extended structure.

4. A tent structure comprising a pair of axially aligned, spaced spindles, means supporting the spindles in an elevated position above the ground, a pair of horizontally disposed tubular side arms pivotally carried by the spindles, side legs telescopically received within the side arms, said legs being connected by a cross member, means holding the outer ends of the legs clear of the ground, a pair of vertically disposed tubular side arms pivotally mounted on the spindles, side legs telescopically received within the free ends of the arms, said latter side legs being connected by a cross member, intervening angularly positioned pairs of tubular side arms, telescoping legs and cross members disposed between the vertical and horizontal side arms, means for adjustably securing the legs to the side arms, spacing members extending between the several legs, said spacing members being pivotally connected to one leg and detachably connected to the other and a fabric covering shaped to enclose the structure.

Signed at Winnipeg, this 30th day of January, 1928.

AUGUSTUS F. MARGOT.
WILLIAM H. MARGOT.